United States Patent [19]

Knapp

[11] 4,165,715
[45] Aug. 28, 1979

[54] ANIMAL SPRAY

[76] Inventor: Frank Knapp, R.F.D. No. 3, Mineral Point, Wis. 53565

[21] Appl. No.: 885,004

[22] Filed: Mar. 9, 1978

[51] Int. Cl.² ........................................... A01K 29/00
[52] U.S. Cl. ................................................... 119/159
[58] Field of Search .......................... 119/159, 156, 160

[56] References Cited
U.S. PATENT DOCUMENTS

| 788,722 | 5/1905 | Kouns ................................. 119/159 |
| 3,032,011 | 5/1962 | Stramel ................................ 119/159 |
| 3,602,199 | 8/1971 | Diggs ................................... 119/159 |
| 3,870,023 | 3/1975 | Wilson ................................. 119/159 |
| 3,884,192 | 5/1975 | Knapp .................................. 119/159 |

Primary Examiner—Hugh R. Chamblee
Attorney, Agent, or Firm—Kinzer, Plyer, Dorn & McEachran

[57] ABSTRACT

A frame supporting spray means is in the form of a stall, open at one end and closed at the other end by a trough; nothing happens when the animal enters, so he enters unsuspectingly, but he gets the full treatment when he backs out.

5 Claims, 4 Drawing Figures

U.S. Patent  Aug. 28, 1979  4,165,715
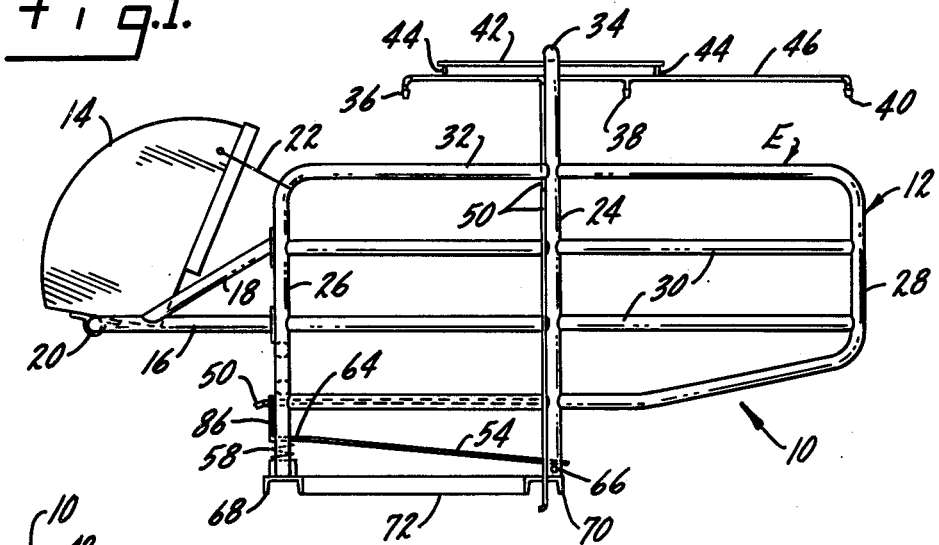
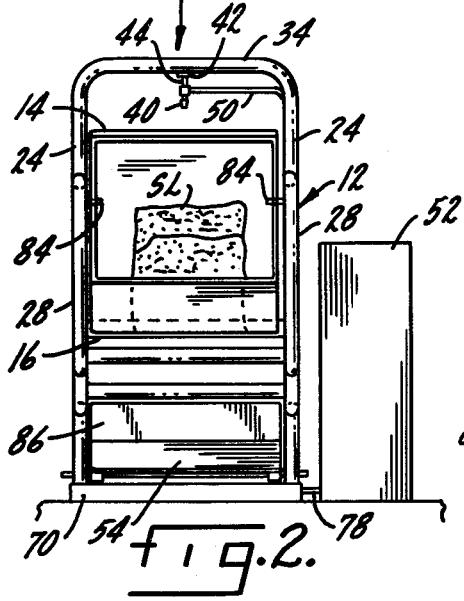
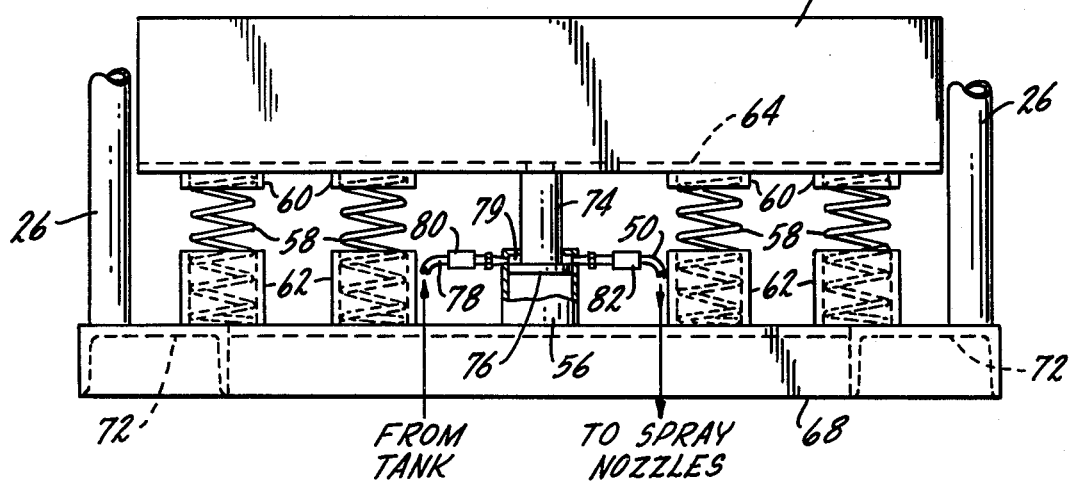

ANIMAL SPRAY

This invention relates to an animal-operated sprayer.

In my U.S. Pat. No. 3,884,192 I have disclosed an animal-operated sprayer which is oriented to movement of the animal into and out of a pen. In some instances a pen is undesirable, or may not be easily built; and in other instances the spray apparatus of my patent may not be deemed easily transportable, or affordable by some stock raisers.

The disadvantages of certain animal-operated sprayers previously used are stated in my earlier patent and are repeated here. The primary object of the present invention is to construct an animal-operated (automatic) sprayer which need not be combined with a pen, which is relatively small and inexpensive but which is nonetheless effective to assure spray contact for a prolonged period of time, and to reduce even further the chance an animal will be frightened away.

In the drawing:

FIG. 1 is a side elevation of the spray apparatus;

FIG. 2 is an end view thereof, showing the supply tank in addition;

FIG. 3 is a detail plan view of the treadle; and

FIG. 4 is a fragmentary detail view at the end of the apparatus opposite FIG. 2, on the enlarged scale of FIG. 3.

The spray apparatus 10, FIGS. 1 and 2, includes a frame 12 which is open at the right hand end as viewed in FIG. 1 permissive of entry by a cow. The frame therefore affords a stall for the animal. An inducement or inticement is located at the opposite end of the frame and preferably is a trough 14 containing a salt lick SL. A means is provided at the opposite ends of the frame to support the trough and such means is represented by a forwardly extending tubular support 16 and brace 18. The trough could as well contain a supply of hay.

The trough 14 may be hinged on the supporting means 16 as at 20 and held against a gravity fall by a line 22. By loosening the line the trough 14 may be pivoted or dropped counterclockwise as viewed in FIG. 1 in order to be filled conveniently.

The frame, as will be recognized, is constructed almost entirely of tubular piping, including a pair of medially located uprights 24, a pair of forward uprights as 26 to which the support means 16–18 is fastened and a pair of end arms as 28. The uprights are spaced and rigidified by horizontal side stringers 30.

The medial uprights 24 extend above the uppermost cross bracing 32. The uprights 24 are joined by a medial transverse brace 34.

The medial uprights 24 and the cross brace 34 related thereto are used to support a plurality of spray nozzles 36, 38 and 40. This support is preferably accomplished by welding a strap 42 to the underside of the cross brace 34 and a pair of stub tubes 44 are in turn fixed to the underside of the strap 42. A long horizontal header tube 46 is welded to the lower ends of the stub tubes 44.

The nozzles 36, 38 and 40 communicate with the header 46, are directed downwardly and are so positioned as to spray, respectively, the shoulders, the back and the haunches of a cow as will be explained.

The header 46 is supplied with a liquid to be sprayed by an upright conduit 50, derived from a tank 52 located at the side of the spray apparatus. The tank will contain a body of liquid pesticide.

A treadle 54 is located inside the stall. When the animal stands on the treadle liquid is withdrawn from the tank 52 and stored in a cylinder 56 located beneath the treadle. When the animal backs out of the stall the animal is sprayed.

The cylinder 56 acts as a suction pump in one mode and a pressurizing pump in the other mode. To this end the treadle or platform 54 is normally biased or located in an upper position when there is no animal standing in the stall. This upward bias is accomplished by a plurality of coil springs 58, FIG. 4, having opposite ends confined by guides 60 and 62. The guides 60 are carried by a horizontal extension 64 at the forward end of the treadle. The opposite end of the treadle is pivotally supported at 66 in position between the medial uprights 24. A stop (not shown) may be employed to limit the upper position of the treadle, although the springs may be so selected that in their fully relaxed or extended position the platform 54 is properly located in its normal attitude.

The other spring guides 62 are located on the upper side of a ground-supported cross channel member 68 at the front of the frame. Channel 68 supports the front uprights 26; a similar cross channel member 70 is used to support the medial uprights 24. The base structure is completed by a pair of side channel members 72 which brace the channels 68 and 70. Accordingly the treadle 54 is substantially at ground level.

The cylinder 56 is fixed to the upper side of the front channel member 68. A piston rod 74 is fixed to the underside of the horizontal front extension 64 of the treadle 54 so as to partake of substantially true vertical motion. The piston 76 is positioned inside the cylinder 56.

A conduit 78, FIG. 2, communicates with the inside of the tank 52. Conduit 78 at the opposite end communicates with a chamber 79 inside cylinder 56 which is on the rod side of the piston. A check valve 80, FIG. 4, is interposed in conduit 78 and is permissive of one-way flow from the tank to chamber 79 when the piston 76 moves downwardly as a result of the front legs of the animal bearing on the treadle 54.

One end of conduit 50, FIG. 4, communicates with chamber 79 inside the cylinder 56. A check valve 82 is interposed in conduit 50 and is permissive only of one-way flow from chamber 79 to the spray nozzles. This occurs when the animal backs out of the stall, allowing springs 58 to restore the treadle corresponding to the upward or pressure stroke of piston 76. Preferably there are a pair of spray nozzles 84, FIG. 2, for spraying the sides and flanks of the animal. These two nozzles of course communicate with conduit 50.

Cows are shy, apprehensive and easily frightened. With this in mind, then, the cow induced to enter the stall does so unsuspectingly because the downward stroke of the piston only charges chamber 79 without any spray being emitted. The cow has no apprehension about entering all the way and "feeding" at the trough 14 which, of course, obstructs further forward movement. A hoof guard 86 may be positioned at the front of the stall immediately beneath the trough.

After feeding, the contented cow backs out of the stall. The extension E of the frame, rearward of the uprights 24, forces the cow to take time to back straight out compared to a quick lateral movement away from the trough, and during this interlude the cow gets the full treatment by being sprayed with pesticide at the shoulders, back, hindquarters and flanks. Nozzles 84 may be positioned to point somewhat rearwardly.

It will be seen then that no pen is involved, rather, a mere stall wide enough to permit entry of only one cow, but nonetheless the length of the frame is such that backward movement of the animal is prolonged and it is during this time the animal is sprayed, not during entry. During entry, the blocked end of the stall and the narrow entry (see FIG. 2) if combined with a spray at the time of entry may be too much for the skitterish cow but I have found there is very little reluctance if full treatment is withheld until the last.

It should also be mentioned the stall is approximately the length of a full grown cow, or one nearly so, which means that there is only room for the forelegs on the treadle when the cow is at the trough. In other words, the treadle occupies about half the length of the stall and responds to about half the weight of a full grown cow to assure the pumping cylinder is actuated in the suction mode when the cow is all the way in with its forelegs on the treadle and the weight of its hindquarters on the ground, while the cylinder is actuated in the pressure applying mode when the animal steps off the treadle.

I claim:

1. An animal spray apparatus responsive to the weight of the animal and comprising a frame defining a stall allowing the entry of only one animal at a time, said stall being open at one end enabling the animal to enter therein, a trough at the opposite end of the frame for presenting an enticement to the animal and so obstructing said opposite end of the frame as to require an enticed animal to back out of the stall after indulging, an inclined ground level treadle inside the frame interposed in the path of the animal, resilient means normally biasing the treadle upwardly so that the treadle is urged downwardly by the forelegs of an animal stepping thereon, a cylinder beneath the treadle, a piston attached to the treadle and disposed in the cylinder, said frame supporting at least a pair of spray nozzles directed generally toward the backside of an animal standing at the trough, a first conduit adapted to communicate with a tank at the side of the frame containing a body of liquid to be sprayed on the animal, said conduit communicating with a pumping chamber inside the cylinder and having a first check valve therein to admit one-way flow of liquid from the tank to said chamber when the treadle is moved downwardly, a second conduit communicating with each of the spray nozzles and also communicating with said chamber, a second check valve in the second conduit permissive of one-way flow of liquid from said chamber to the spray nozzles when the treadle moves upward as an incident to the animal backing out of the stall to prolong the spray treatment compared to a lateral movement of the animal away from the trough.

2. Apparatus according to claim 1 including spray nozzles supported by the frame for spraying the flanks of the animal.

3. Apparatus according to claim 2 having a hoof guard at the top of the treadle.

4. An animal spray apparatus responsive to the weight of the animal and comprising a frame defining a stall allowing the entry of only one animal at a time, said stall being open at one end enabling the animal to enter therein, means adjacent the opposite end of the frame for presenting an enticement to the animal and so obstructing said opposite end of the frame as to require an enticed animal to back out of the stall after indulging, a treadle inside the frame interposed in the path of the animal, means normally biasing the treadle upwardly so that the treadle is urged downwardly by an animal stepping thereon, a pumping cylinder and piston therein operated by the treadle, said frame supporting spray means directed generally toward the backside of an animal indulging inside the stall, a first conduit adapted to communicate with a tank at the side of the frame containing a body of liquid to be sprayed on the animal, a second conduit communicating with said spray means, and valve means so connecting the conduits to the cylinder that the spray means is activated only when the cow steps off the treadle when backing out of the stall.

5. Apparatus according to claim 4 having a hoof guard at the end of the treadle remote from said open end of the frame.

* * * * *